B. REMMERS.
APPARATUS FOR PREPARING POTATOES.
APPLICATION FILED JUNE 13, 1916.

1,327,254. Patented Jan. 6, 1920.

INVENTOR
Bernhard Remmers
BY Synnestvedt, Bradley,
Lechner & Fowkes
ATTORNEYS.

WITNESS:
Rob't R. Kitchel

UNITED STATES PATENT OFFICE.

BERNHARD REMMERS, OF PHILADELPHIA, PENNSYLVANIA, ASSIGNOR, BY MESNE ASSIGNMENTS, TO ARMOUR GRAIN COMPANY, OF CHICAGO, ILLINOIS, A CORPORATION OF NEW JERSEY.

APPARATUS FOR PREPARING POTATOES.

1,327,254.  Specification of Letters Patent.  Patented Jan. 6, 1920.

Application filed June 13, 1916. Serial No. 103,370.

*To all whom it may concern:*

Be it known that I, BERNHARD REMMERS, a citizen of the United States, residing at Philadelphia, county of Philadelphia, and State of Pennsylvania, have invented a new and useful Apparatus for Preparing Potatoes, of which the following is a specification.

This invention relates to apparatus for removing the skins and ricing potatoes or other vegetables or fruits, and the object is to provide an improved apparatus by means of which the operation of separating the pulp of vegetables or fruits from the skins and the ricing of the pulp is uninterrupted; to provide an apparatus which accomplishes the separation of the pulp from the skin with a minimum amount of waste; and in general, to provide an apparatus which automatically removes the skin from the pulp and in the same operation forces the pulp through holes from which it emerges in a finely divided condition and automatically discharges the skin, thereby effecting a saving over the manual processes heretofore used. One embodiment of the invention is shown in the accompanying drawings wherein—

Figure 1:
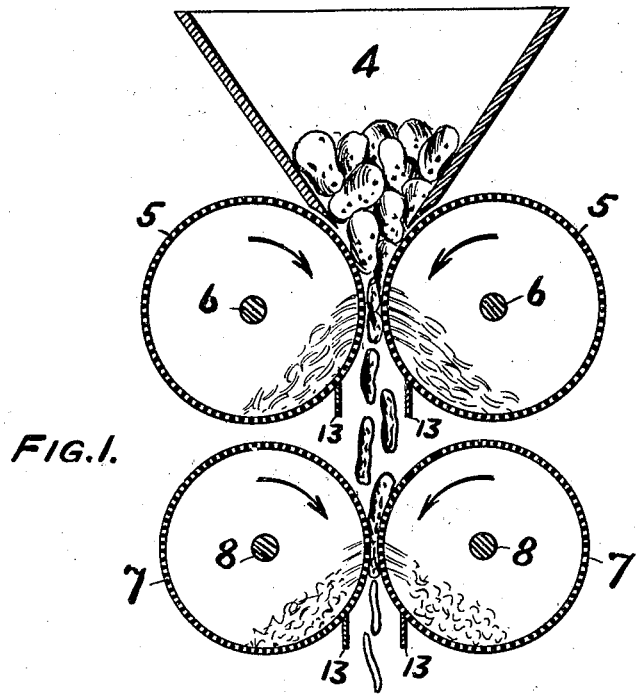
Figure 2:
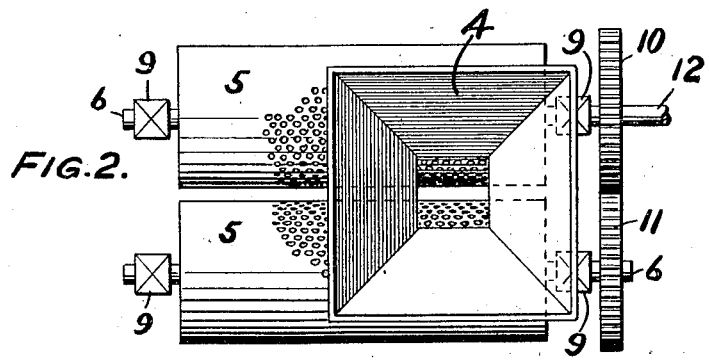

Figure 1 is an end elevation in section of the apparatus; Fig. 2 is a top plan view, and Fig. 3 is a side view of the upper portion of the apparatus as shown in Fig. 1.

The apparatus will be herein described as it is used for the peeling and ricing of cooked potatoes, although it will be understood that it can be similarly used for a large variety of vegetables and fruits, without any material change in its construction or operation.

As shown in Fig. 1 the cooked potatoes are thrown into the hopper 4 and fed by gravity through the bottom of the hopper and down between the revolving foraminous cylinders 5, the hopper being placed sufficiently near to the cylinders so that the weight of the superimposed potatoes tends to force the lowermost potatoes down between the revolving cylinders and prevents their being forced upward when they are being engaged by the cylinders. The cylinders 5 are perforated throughout their circumference and substantially their entire length, the total area of the perforations being approximately equal to the area of the unperforated portion, and are mounted on, and turn with, the shafts 6, the cylinders being spaced apart as shown. Below and in alinement with the cylinders 5 is a pair of similar cylinders 7 mounted on the shafts 8, the cylinders 7, however, being closer together than are the cylinders 5. Both pairs of cylinders are inclined as shown in Fig. 3, to facilitate the discharge of the material from within. Scrapers 13 are mounted to contact with each cylinder throughout its length in order to scrape from the cylinders any skins which may adhere thereto and allow such skins to fall down between another pair of cylinders or into a receptacle.

Figure 3:
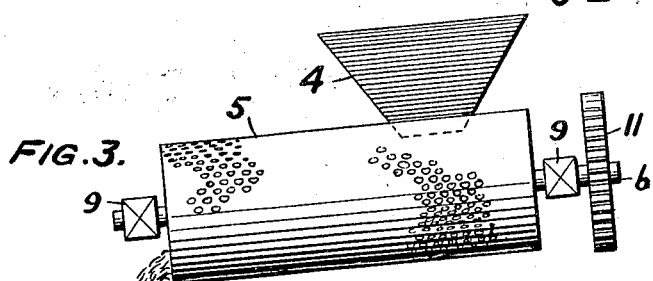

Fig. 3 shows the manner of mounting and driving the cylinders 5, the cylinders 7 being mounted and driven in the same manner. The shafts 6 turn in their bearings 9 and have at one end the gears 10 and 11, the gear 10 being driven by any convenient source of power, through the shaft 12, and the gear 10 in turn drives the gear 11, so that the cylinders are rotated toward one another as shown by the arrows in Fig. 1.

The drawing is diagrammatic, and the spacing between the cylinders of each pair has been exaggerated somewhat in order to make the disclosure clearer. It will be seen that the cylinders 5 lie in the same plane, slightly inclined from the horizontal. By this construction the potatoes are more readily gripped by the cylinders and are fed vertically downward.

The operation of the apparatus is as follows: cooked potatoes are placed in the hopper 4 from whence they pass down between the revolving foraminous cylinders 5, which cylinders are placed close enough together to squeeze the potatoes and force the larger portion of the pulp away from the skins and through the perforations into the interior of the cylinders. The skins being tougher than the pulp, they are not broken sufficiently to be forced through the openings in the cylinders, but are merely flattened out and passed along. After passing the cylinders 5 the skins fall onto the cylinders 7, which rotate in the same manner as cylinders 5, and as some of the pulp is still adhering to the skins, the cylinders 7 being placed very closely together, squeeze the remaining pulp from the skins and through the perforations into the cylinders, the empty skins falling clear of the cylinders. The cylinders being slightly inclined, the pulp which is forced into them is carried by the action of gravity to the lower ends of the cylinders where it falls into suitable receptacles.

The action of forcing the pulp through the perforations not only separates it from the skin, but due to the smallness of the holes divides the pulp into small particles, that is, rices them.

While I have shown the apparatus as embodying in preferred form two pairs of cylinders, the cylinders 7 could be dispensed with if the cylinders 5 were placed closely enough together to squeeze all of the pulp from the skins, but the two pairs of cylinders arranged as shown, I have found to be more efficient where large sized fruits or vegetables are to be handled. It will also be apparent that more than two pairs of cylinders could be used if desired.

I claim:—

1. A machine for preparing potatoes and the like, comprising a pair of oppositely rotatable hollow cylinders disposed in parallel relation with their axes inclined to the horizontal and having perforated walls spaced a fixed distance apart, said cylinders so mounted relative to each other as to receive the potatoes therebetween and to squeeze the pulp from the skins through the perforations into the cylinder interiors and to discharge the same from the lower ends thereof while passing the skins onward between the cylinders.

2. A machine for preparing potatoes and the like, comprising a plurality of pairs of oppositely rotatable hollow cylinders, the members of each pair disposed in parallel relation with their axes inclined to the horizontal, and having perforated walls, the successive pairs of cylinders having the walls of their members fixedly spaced apart a progressively diminishing distance, the several cylinders so mounted relative to each other as to receive the potatoes between the members of the first pair and to squeeze a portion of the pulp from the skins through the perforations into the cylinder interiors while passing the partially pulp-freed skins to the succeeding pair of cylinders where the remaining pulp is squeezed from the skins through the periphery into the last mentioned cylinder interiors and the pulp-freed skins pass onward between the last pair of cylinders, the riced potatoes being discharged from the lower ends of the cylinders.

In testimony whereof I have hereunto signed my name.

BERNHARD REMMERS.